United States Patent
Adam et al.

(10) Patent No.: US 6,628,725 B1
(45) Date of Patent: Sep. 30, 2003

(54) METHOD AND SYSTEM FOR ENCODING DATA FOR TRANSMISSION OVER A SERIAL LINK

(75) Inventors: Joel Fredric Adam, Cupertino, CA (US); Darren Scott Engelkemier, Mountain View, CA (US); Edward Everett Sprague, Woodside, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 10/002,739

(22) Filed: Nov. 2, 2001

Related U.S. Application Data

(60) Provisional application No. 60/279,416, filed on Mar. 28, 2001.

(51) Int. Cl.[7] .............................................. H04L 27/00
(52) U.S. Cl. ........................ 375/259; 375/354; 341/60
(58) Field of Search ................................ 375/259, 265, 375/285, 354, 362, 363, 364; 341/52, 55, 60, 94

(56) References Cited

U.S. PATENT DOCUMENTS

| | | | | |
|---|---|---|---|---|
| 4,502,143 A | * | 2/1985 | Kato et al. ................. | 359/158 |
| 4,771,458 A | | 9/1988 | Citta et al. .................... | 380/20 |
| 4,790,013 A | * | 12/1988 | Kage ........................... | 375/365 |
| 5,077,794 A | * | 12/1991 | Taylor ......................... | 375/357 |
| 5,235,645 A | | 8/1993 | Stocker ....................... | 380/48 |
| 5,410,600 A | | 4/1995 | Toy .............................. | 380/9 |
| 5,894,517 A | * | 4/1999 | Hutchison et al. .......... | 380/268 |
| 5,898,394 A | | 4/1999 | Kobayashi et al. ........... | 341/58 |
| 6,097,735 A | * | 8/2000 | Nemoto ...................... | 341/100 |

* cited by examiner

*Primary Examiner*—Don N. Vo
(74) *Attorney, Agent, or Firm*—Michael Cammarata; Douglas Luftman

(57) ABSTRACT

An exemplary embodiment of the invention is a method for encoding data into a 48B/50B format for transmission over a serial link. A data stream that includes characters is received and segmented into a six-character block. The block of six characters is translated into a 50-bit byte frame in 48B/50B format. A 48-bit word is created from the block of six characters by encoding the characters contained in the block. The 48-bit word is scrambled and a 2-bit synchronization sequence is appended to the scrambled 48-bit word. The result is the 50-bit byte frame in 48B/50B format. An alternate embodiment of the present invention includes a method for decoding data from the 48B/50B format.

19 Claims, 4 Drawing Sheets

METHOD AND SYSTEM FOR ENCODING DATA FOR TRANSMISSION OVER A SERIAL LINK

CROSS-REFERENCE

This application claims the benefit of U.S. Provisional Application Ser. No. 60/279,416, entitled "45B/50B: A Low Overhead Encoding Scheme for High-Speed Serial Links", filed Mar. 28, 2001, the entire contents of which are incorporated herein by this reference.

BACKGROUND OF THE INVENTION

1. Field of Invention

The invention relates generally to a method and system for encoding data that is transmitted over a serial link.

2. Description of Related Art

Data in communication systems is often encoded before being serialized and transmitted over serial links. Encoding can increase the transition density of the serial stream and assure the DC-balance of the serial stream. Transition density refers to the rate of transitions from zero to one and from one to zero in the serial bit stream. A high rate of transition is required so that the electrical component receiving the serial stream can accurately recover the bits in the serial stream. The transitions aid the receiver in deducing the bit alignment of the serial stream. DC-balance refers to having an equal number of ones and zeros in the serial stream on average. Having DC-balance is helpful because optical lasers used for communication operate effectively when the serial stream they are transmitting is DC-balanced.

An example of a serial link encoding scheme is the 8B/10B encoding standard that is used in Gigabit Ethernet (GE). In this scheme, user data bytes are encoded into 10-bit values prior to being sent over the serial link. These 10-bit values are called data characters. A number of 10-bit control characters are defined to indicate control information in the data stream. Control characters are used in communication systems to indicate control information in the data stream such as the start of a data packet, the end of a data packet or that the communication link is not in use. Control characters can be differentiated from data characters, used to represent the user data, because the two types of characters take on different values. The 8B/10B encoding scheme assures DC-balance and good transition density when the data stream is serialized. The maximum run-length in 8B/10B encoding is five bits. A drawback to using the 8B/10B encoding scheme is the high bandwidth overhead incurred in the encoding process. The overhead of 8B/10B encoding is twenty-five percent. This high overhead wastes a large portion of the available bandwidth on the serial link.

Another serial link encoding scheme is the 64B/66B encoding scheme. It was developed as part of the ten Gigabit Ethernet (10GE) standard to convert four 8B/10B encoded data streams, each with a bit rate of 3.125 gigabits per second, into a single data stream with a bit rate of 10.3125 gigabits per second. Each of the 8B/10B encoded data streams has an overhead of twenty-five percent while the single 64B/66B data stream has an overhead of 3.125%. In the 64B/66B encoding scheme, scrambling and a guaranteed bit transition every 66 bits are used to ensure adequate transition density and DC-balance. Compared to the 8B/10B encoding scheme, the 64B/66B encoding scheme has lower overhead. The 64B/66B encoding scheme, however, has transition density and DC-balance properties that are not as good as the 8B/10B encoding scheme.

Another protocol with provisions for serializing a byte-wide data stream is the Synchronous Optical Network (SONET) standard. In SONET, a scrambling polynomial is applied to the data stream in order to achieve acceptable DC-balance and transition density. Important events in the data stream are indicated by overhead bytes. The overhead bytes are assigned particular locations within the fixed-size SONET frame. The SONET frames are delineated by a fixed-sequence of framing bytes. SONET has the advantage of not having any encoding overhead since scrambling is used and the overhead bytes are in fixed locations. However, because the overhead bytes must be present in each SONET frame, the overhead bytes do represent wasted bandwidth in frames where they are not used. In addition, SONET has a poorer guaranteed transition density compared to the 8B/10B and 64B/66B encoding schemes, and its DC-balance is not as good as that of the 8B/10B encoding scheme.

SUMMARY OF THE INVENTION

An exemplary embodiment of the invention is a method for encoding data into a 48B/50B format for transmission over a serial link. A data stream that includes characters is received and segmented into a six-character block. The block of six characters is translated into a 50-bit byte frame in 48B/50B format. A 48-bit word is created from the block of six characters by encoding the characters contained in the block. The 48-bit word is scrambled and a 2-bit synchronization sequence is appended to the scrambled 48-bit word. The result is the 50-bit byte frame in 48B/50B format. An alternate embodiment of the present invention includes a method for decoding data from the 48B/50B format. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

An exemplary embodiment of the present invention includes an encoding scheme, referred to as the 48B/50B encoding scheme, for data transmission over serial links. In an exemplary embodiment, the 48B/50B format includes a 50-bit byte frame that contains six 8-bit words and two synchronization sequence bits.

Figure 1:
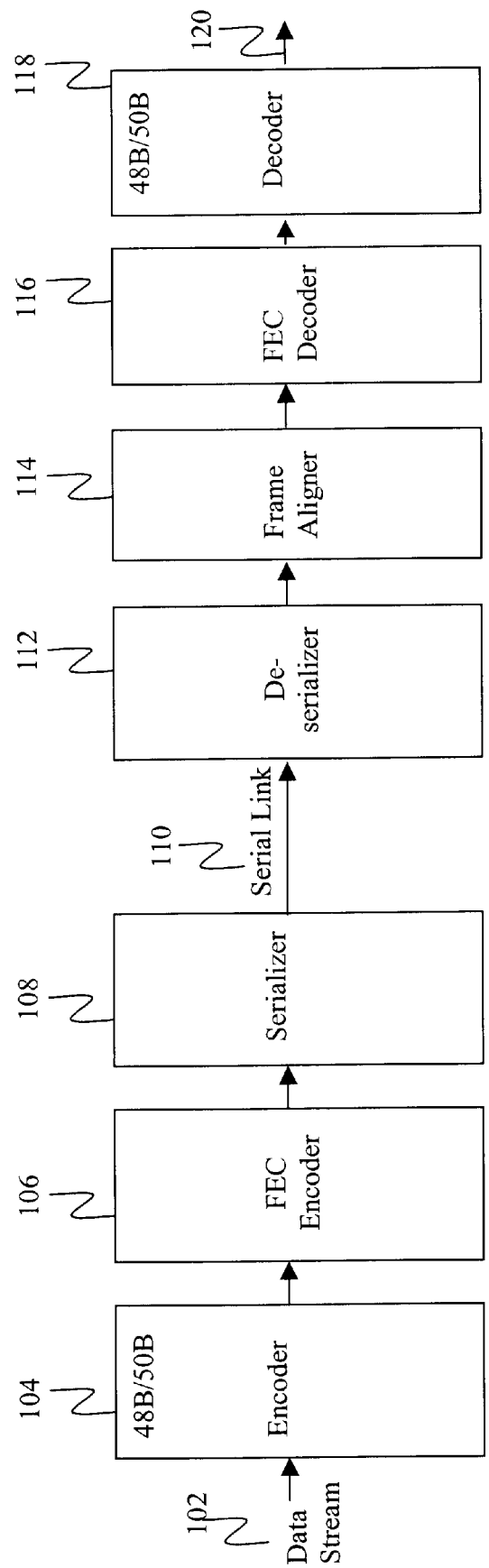
FIG. 1 is a block diagram of an exemplary system that includes a 48B/50B encoder and a 48B/50B decoder.

Referring to FIG. 1, a data stream 102 is input into an exemplary 48B/50B encoder 104. The data stream is encoded, using the steps outlined in FIG. 2, steps 202 through 208, into an exemplary 48B/50B format. The result of the 48B/50B encoding process is a 50-bit byte frame that is transmitted to an FEC encoder device 106 that performs forward error correction (FEC). The output from the FEC encoder 106 is input into a serializer 108. Alternately, the FEC and 48B/50B encoding functions could be performed using different circuitry or software in the same device. The serializer 108 can be any one that is known in the art. In an exemplary embodiment, the serializer 108 is a Gigabit Ethernet (GE) serializer or a 10GE serializer both of which have bus widths equal to ten bits. The output from the serializer 108 is then sent across a serial link 110. The data is received at the other end of the serial link 110 by a receiving deserializer 112. The output from the deserializer 112 is then input to a frame aligner 114 with the output from the frame aligner being input into a FEC decoder 116. The output from the FEC decoder 116 is input into a 48B/50B decoder 118. These three blocks, the frame aligner 114, the FEC decoder 116, and the 48B/50B decoder 118, perform the steps outlined in FIG. 4. The output from the 48B/50B decoder 118 is a data stream 120 containing groups of six characters.

Figure 2:
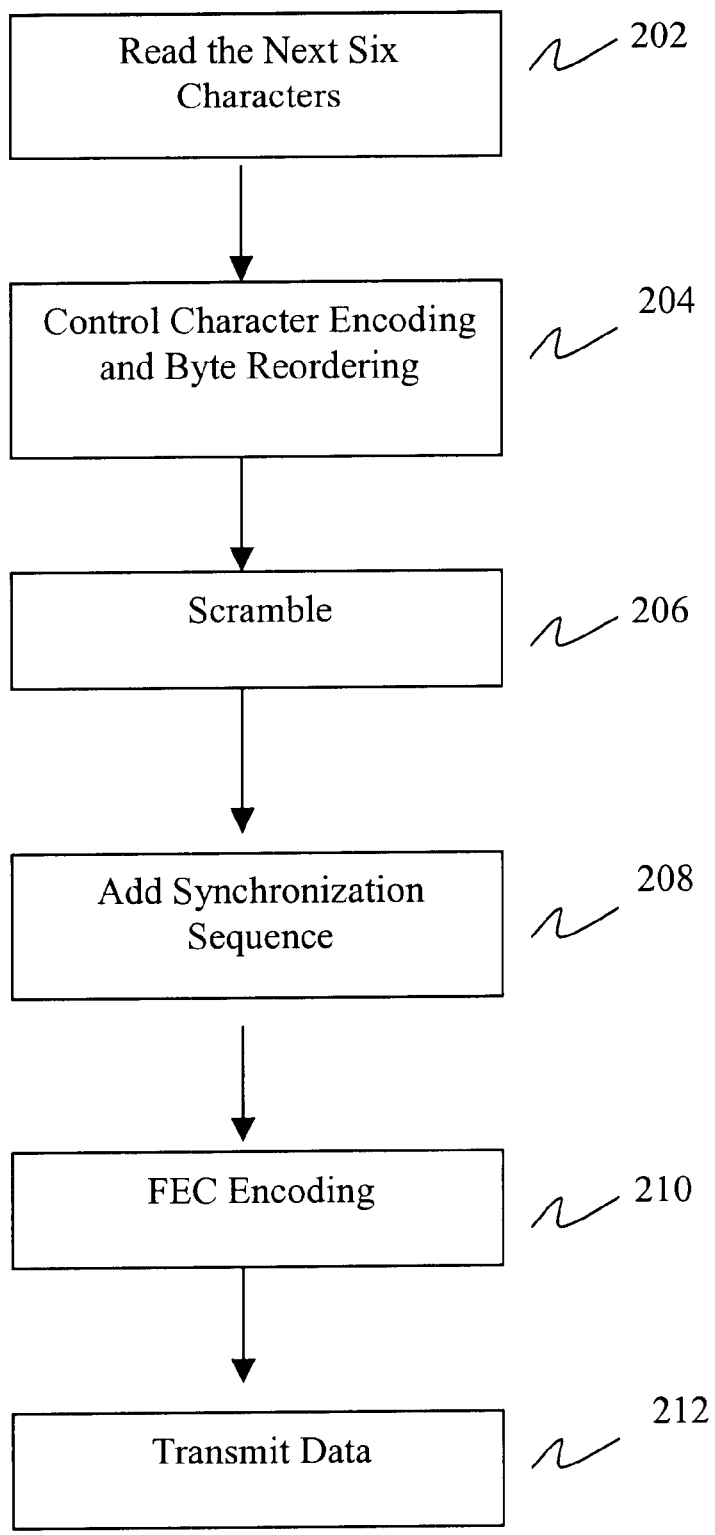
FIG. 2 is a flowchart of an exemplary encoding process.

FIG. 2 is a flowchart of an exemplary embodiment of an encoding process used to produce output in 48B/50B format. FIG. 2 also depicts FEC encoding and then transmitting the data. The encoding process encodes a data stream, including user data in byte form and control characters, prior to transmission over a serial link. The user data is referred to as data characters. The process depicted in FIG. 2 segments a data stream into groups of six characters and then translates these character groups into 50-bit words, called byte frames, in 48B/50B format. These byte frames are then FEC encoded and transmitted to a receiver. The process of 48B/50B encoding begins at step 202 by reading the next six characters from the input data stream 102. The characters can be a mix of control characters and data characters or the characters can be all control characters or all data characters.

At step 204, the six characters are encoded which includes byte reordering and control character encoding or mapping. The control characters are mapped into 8-bit control words and the data characters are kept in byte form as 8-bit data words. As part of the encoding, all control words are moved to the beginning of the group while maintaining their relative relationship to each other. In an exemplary embodiment, each control character in the input data stream 102 is mapped into an 8-bit control word which indicates its position within the group, the control character instruction, and whether the next word is an encoded control word or an encoded data word. Many control character mapping schemes can be used with embodiments of the present invention. One example of a control character mapping scheme is to use the lower three bits of the 8-bit control word to indicate the position of the control word within the group, the next bit to indicate whether the next word is an encoded control word and the remaining four bits to indicate the type of control character. Another example of a control character mapping scheme is to use the lower three bits of the 8-bit control word to indicate the position of the control word within the group, the next two bits to identify the type of control character, the next bit to indicate whether the next word is an encoded control word and to leave the remaining two bits unused. After the characters have been mapped into 8-bit words and the words reordered, the group of six words comprise an encoded 48-bit word and step 204 is complete.

At step 206, the 48-bit word is scrambled to assure good DC-balance and transition density. Scrambling is used to break up long runs of binary zeros or ones that may exist when the data stream is serialized. In an exemplary embodiment, scrambling is performed by applying the output of a scrambler circuit to each data bit in the 48-bit word. The output of the scrambler can be updated every bit time and can be based on a polynomial. Any scrambler polynomial that is known in the art can be used as long as it has good randomization properties. In an exemplary embodiment, the 48B/50B encoding scheme utilizes the scrambler used in SONET systems which is based on the polynomial $1+x^6+x^7$.

Figure 4:
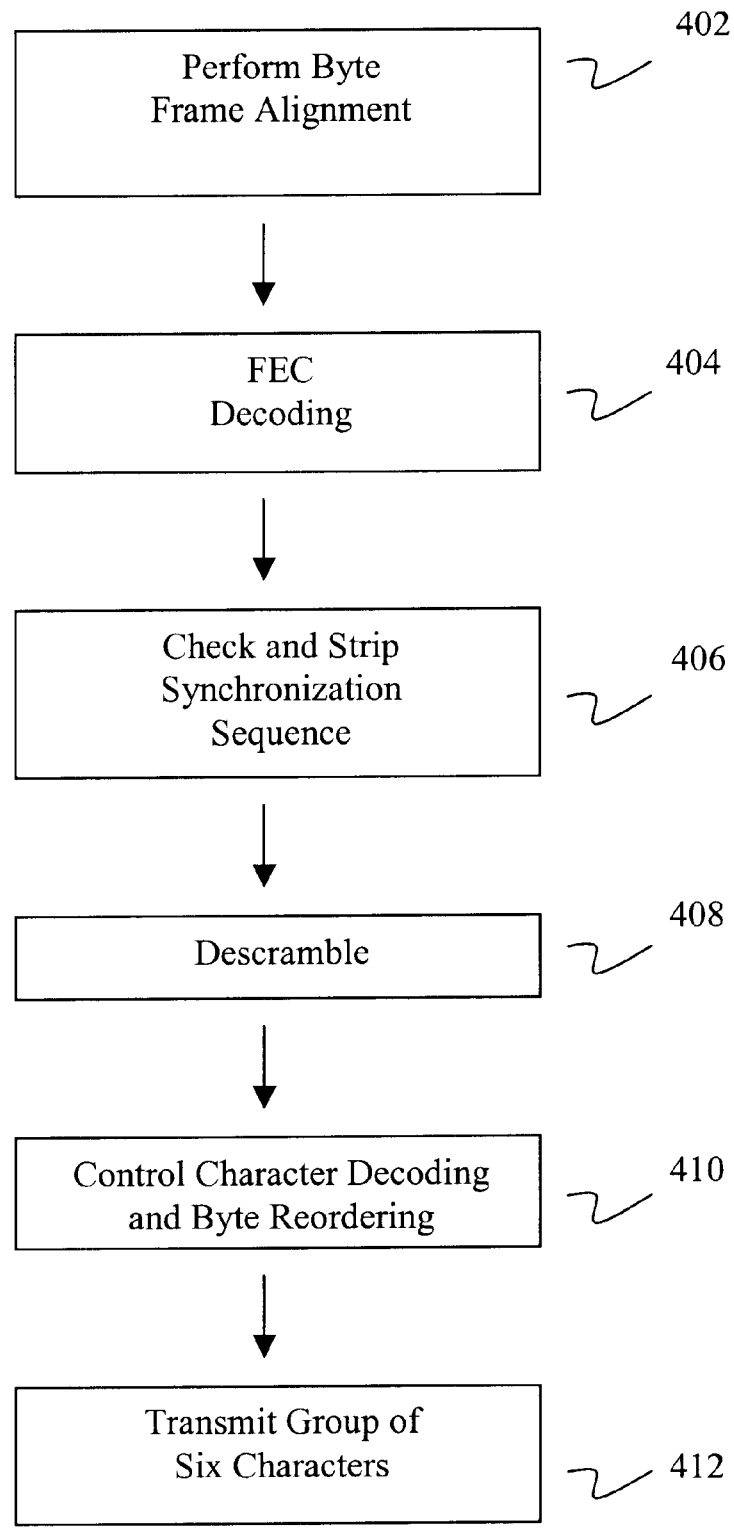
FIG. 4 is flowchart of an exemplary decoding process.

At step 208, a 2-bit synchronization sequence (SS) is appended to the scrambled 48-bit word (e.g., at the beginning of the 48-bit word) in order to form a 50-bit word. This 50-bit word is referred to as a byte frame. The synchronization sequence is used to indicate whether the byte frame contains any control words. In an exemplary embodiment, a sequence value of "10" indicates that the byte frame contains at least one control word and a value of "01" indicates that the byte frame does not contain any control words. In the event that the byte frame contains control words, decoding as described in FIG. 4 is performed at the decoder. In an exemplary embodiment, the synchronization sequence also provides at least one bit value transition every fifty-one bits, therefore limiting the run-length of the serial stream to fifty bits. Once the synchronization sequence is appended, the 48B/50B encoding process is complete and step 210 is performed, in an exemplary embodiment, to FEC encode the 50-bit byte frame. Step 212 is then performed to transmit the 50-bit byte frame and in an exemplary embodiment, the 50-bit byte frame is transmitted to a serializer.

Figure 3:
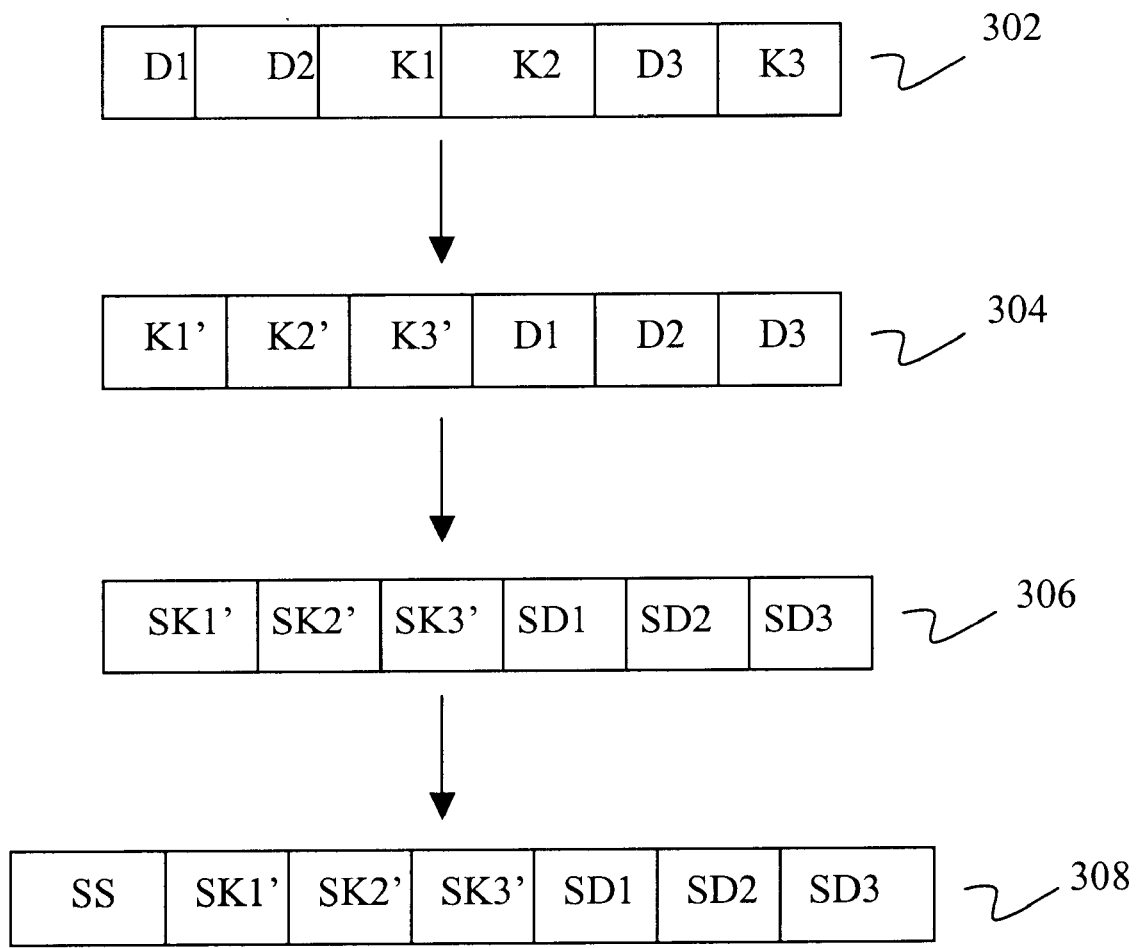
FIG. 3 depict the transformation of a data stream into an exemplary 48B/50B format when the encoding process shown in FIG. 2 is applied.

FIG. 3 illustrates the transformation of an exemplary data stream into a 50-bit byte frame in 48B/50B format when the encoding process shown in FIG. 2, steps 202 through 208 are applied. Characters 302 represent the result of segmenting a data stream 102 into a group of six characters as described in reference to step 202 of FIG. 2. The exemplary data stream contains three data characters denoted as D1, D2, and D3. The exemplary data stream also contains three control characters denoted as K1, K2, and K3. When the characters 302 have been encoded, as described in reference to step 204 in FIG. 2, the result is a 48-bit word 304 made up of six eight-bit words. The three control characters K1, K2, and K3 have been moved to the beginning of the 48-bit word and as a result, the three data characters have been moved to the end of the 48-bit word. In addition, each control character has been encoded using a control character mapping scheme into an 8-bit control word and each data character has been stored in an 8-bit data word. The 8-bit control words are denoted as K1', K2', and K3' and the 8-bit data words as D1, D2 and D3 in 48-bit word 304. A scrambled 48-bit word 306 is the result of performing the scrambling described in reference to step 206 in FIG. 2. The words are depicted with an "S" prefix to indicate that they have been scrambled. Byte frame 308 contains a 50-bit byte frame that is the result of adding a 2-bit synchronization sequence as described in reference to step 208 in FIG. 2. Byte frame 308 contains an exemplary 50-bit word that is in 48B/50B format as a result of applying steps 202 through 208 described in reference to FIG. 2.

FIG. 4 is flowchart of an exemplary decoding process that is performed after the 50-bit byte frame has been received by a deserializer. At step 402, byte frame alignment is performed so that the user data can be extracted from the byte frame. In an exemplary embodiment, the regular appearance of the synchronization sequence every fifty bits can be used to achieve byte frame alignment. At step 404, FEC decoding is performed on the byte frame if FEC encoding had been performed on the byte frame by the sender. The synchronization sequence bits are checked at step 406 to see if the byte frame contains control words. The synchronization sequence bits are then stripped away from the byte frame. Descrambling is performed at step 408 using a descrambler that corresponds to the scrambler used at step 206 in FIG. 2. Next, at step 410, the words are decoded to restore the group of six characters to their original order and values as shown at 302. Decoding is completed and at step 412 the group of six characters is transmitted to a recipient.

In an exemplary embodiment, as shown at step 210 in FIG. 2, a FEC scheme can be applied to the output from the encoding process before the 50-bit byte frame in 48B/50B format is sent to a serializer. The use of FEC with the present invention is optional. FEC can be used to provide error detection and correction capabilities on the link. Many different FEC schemes exist, each having different data and parity block lengths which provide different levels of error protection. An exemplary embodiment of the present invention includes an FEC scheme that is easy to interface to the 48B/50B encoder output bus. An exemplary FEC scheme consists of a one-error BCH correcting code. This exemplary FEC scheme corrects single bit errors and detects two-bit errors. It also calculates a 10-bit parity block for every 500-bits of data. The use of these FEC data and parity block lengths makes it easier to interface the FEC logic to the 48B/50B encoder/decoder and serializer/deserializer. One reason is that ten byte frames fit evenly into the 500-bit FEC data block. Another reason is that the lengths of the FEC data and parity blocks are integer multiples of the serializer/deserializer input bus width. Other FEC schemes are possible which are well matched to the 48B/50B encoder and serializer/deserializer bus widths. Other FEC schemes as known in the art can be used with an embodiment of the present invention.

The 48B/50B encoding scheme achieves good DC-balance and transition properties. In addition, it provides support for control characters at any location within the data stream and it has a low overhead cost of 4.2 percent. An advantage of the present invention is realized by setting the byte frame length to fifty bits. This insures that a 48B/50B formatted serial stream can be recovered by a serializer/deserializer receiver which supports SONET bit streams. Serializer/deserializer receivers that support SONET are designed to perform recovery on bit streams with maximum run lengths of seventy bits. Since the maximum run length of an exemplary embodiment of the 48B/50B encoding scheme is fifty bits, a 48B/50B format encoded bit stream has better guaranteed transition density than a SONET bit stream. The 48B/50B encoded bit stream also has better transition density than that of 64B/66B because 64B/66B only guarantees a transition every sixty-seven bits.

Another advantage of using 50-bit byte frames is that they map evenly into the 10-bit interface of commercial serializer/deserializer devices. On the encoding side, the 50-bit byte frame can be multiplexed onto the 10-bit serializer bus easily. This is contrasted to the 64B/66B encoding scheme used for 10GE, where a gearbox circuit is needed to multiplex a series of 66-bit byte frames onto the same bus for 64B/66B encoding. The use of a 50-bit byte frame reduces the complexity and gate count of the circuit which interfaces the output of the encoder to the serializer.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method for encoding data into a 48B/50B format for transmission over a serial link, said method comprising:

receiving a data stream that includes characters;

segmenting said data stream into a block containing six characters; and translating said block into a 50-bit byte frame, said translating including:

encoding said characters in said block, wherein the output of said encoding includes a 48-bit word; and appending a 2-bit synchronization sequence to said 48-bit word, said appending resulting in said 50-bit byte frame;

wherein said characters include at least one control character, said encoding including mapping said control character to a control word, said control word indicating said control character's original relative position within said six characters, a control instruction and whether a next word in said 48-bit word is a control word or a data word.

2. The method of claim 1 further including transmitting said 50-bit byte frame to a communication device.

3. The method of claim 2 wherein said communication device is a serializer/deserializer.

4. The method of claim 1 wherein:

said block containing said six characters further includes a data character; and said mapping said control character to said control word includes mapping said control character into an 8-bit control word;

said encoding said characters in said block comprises:

storing said data character in an 8-bit data word; and altering the position of the 8-bit control word relative to the 8-bit data word.

5. The method of claim 4 wherein said block of six characters includes a plurality of control characters, said mapping includes mapping into a plurality of control words, and said altering includes altering position of said control words relative to said data word while maintaining an original order of said control words.

6. The method of claim 1 further comprising:

scrambling said 48-bit word prior to appending said 2-bit synchronization sequence to said 48-bit word.

7. The method of claim 6 wherein said scrambling is performed using the polynomial $1+x^6+x^7$.

8. The method of claim 1 further comprising:

applying a forward error correction scheme to said 50-bit byte frame.

9. The method of claim 8 wherein said forward error correction scheme includes a one-error BCH correcting code.

10. A method for decoding data from a 48B/50B format, said method comprising:

receiving a 50-bit byte frame in 48B/50B format, said byte frame including a synchronization sequence and words;

performing byte frame alignment on said byte frame;

removing said synchronization sequence from said byte frame, said removing resulting in a 48-bit word; and decoding said words in said 48-bit word in response to said synchronization sequence, wherein the output of said decoding is a data stream including six characters;

wherein said characters include at least one control character, said decoding including determining a position and type of said control character based on a control word in said 48-bit word, said control word indicating said control character's original relative position within said six characters, a control instruction and whether a next word in said 48-bit word is a control word or a data word.

11. An encoder for encoding data into a 48B/50B format for transmission over a serial link, the encoding comprising:

receiving a data stream that includes characters;

segmenting said data stream into a block containing six characters; and translating said block into a 50-bit byte frame, said translating including:

encoding said characters in said block, wherein the output of said encoding includes a 48-bit word;

appending a 2-bit synchronization sequence to said 48-bit word, said appending resulting in said 50-bit byte frame;

wherein said characters include at least one control character, said encoding including mapping said control character to a control word, said control word indicating said control character's original relative position within said six characters, a control instruction and whether a next word in said 48-bit word is a control word or a data word.

12. The encoder of claim 11 wherein:

said block containing six said characters further includes a data character;

said mapping said control character to said control word includes mapping said control character into an 8-bit control word;

said encoding said characters in said block comprises:

storing said data character in an 8-bit character word; and altering the position of the 8-bit control word relative to the 8-bit character word.

13. The encoder of claim 12 wherein said block of six characters includes a plurality of control characters, said mapping includes mapping into a plurality of control words, and said altering includes altering position of said control words relative to said data word while maintaining an original order of said control words.

14. The encoder of claim 11 wherein said encoding further comprises:

scrambling said 48-bit word prior to appending said 2-bit synchronization sequence to said 48-bit word.

15. The encoder of claim 14 wherein said scrambling is performed using the polynomial $1+x^6+x^7$.

16. The encoder of claim 11 further comprising:

applying a forward error correction scheme to said 50-bit byte frame.

17. The encoder of claim 16 wherein said forward error correction scheme includes a one-error BCH correcting code.

18. A decoder for decoding data from a 48B/50B format, the decoding comprising:

receiving a 50-bit byte frame in 48B/50B format, said byte frame including a synchronization sequence and words;

performing byte frame alignment on said byte frame;

removing said synchronization sequence from said byte frame, said removing resulting in a 48-bit word; and decoding said words in said 48-bit word in response to said synchronization sequence, wherein the output of said decoding is a data stream including six characters;

wherein said characters include at least one control character, said encoding including mapping said control character to a control word, said control word indicating said control character's original relative position within said six characters, a control instruction and whether a next word in said 48-bit word is a control word or an data word.

19. A 48B/50B encoding format for transmitting data over a serial link, said format comprising:

a 50-bit byte frame including two synchronization sequence bits and a 48-bit word containing six 8-bit words encoded from six characters wherein:

a control word is ahead of a data word in said 48-bit word in response to said 48-bit word containing said control word and said data word; and said control word includes position data indicating a control character's original relative position within said six characters, instruction data indicating a control instruction, and next word type data indicating whether a next word in said 48-bit word is a control word or a data word.

* * * * *